March 8, 1949.  M. M. SCHACKETT ET AL  2,463,719
INTERCHANGEABLE PLANT AND FLOWER RECEPTACLE
Filed Dec. 29, 1945  2 Sheets-Sheet 1
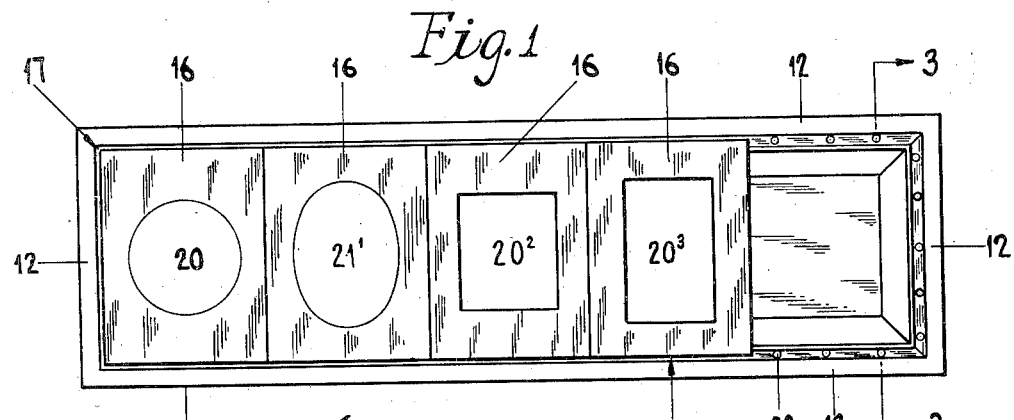
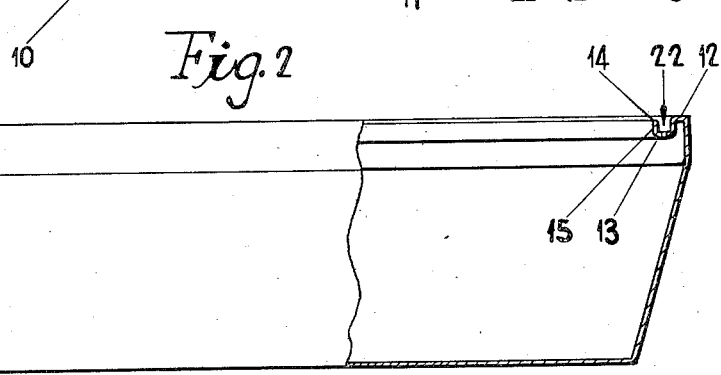
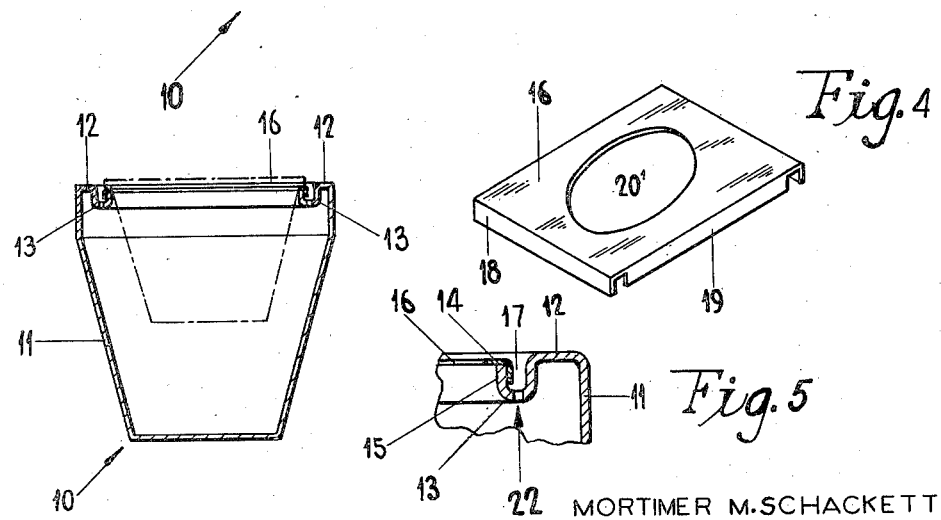
MORTIMER M. SCHACKETT
JAY L. SCHACKETT
INVENTORS
BY Joseph Blacker
ATTORNEY March 8, 1949.   M. M. SCHACKETT ET AL   2,463,719
INTERCHANGEABLE PLANT AND FLOWER RECEPTACLE
Filed Dec. 29, 1945   2 Sheets-Sheet 2
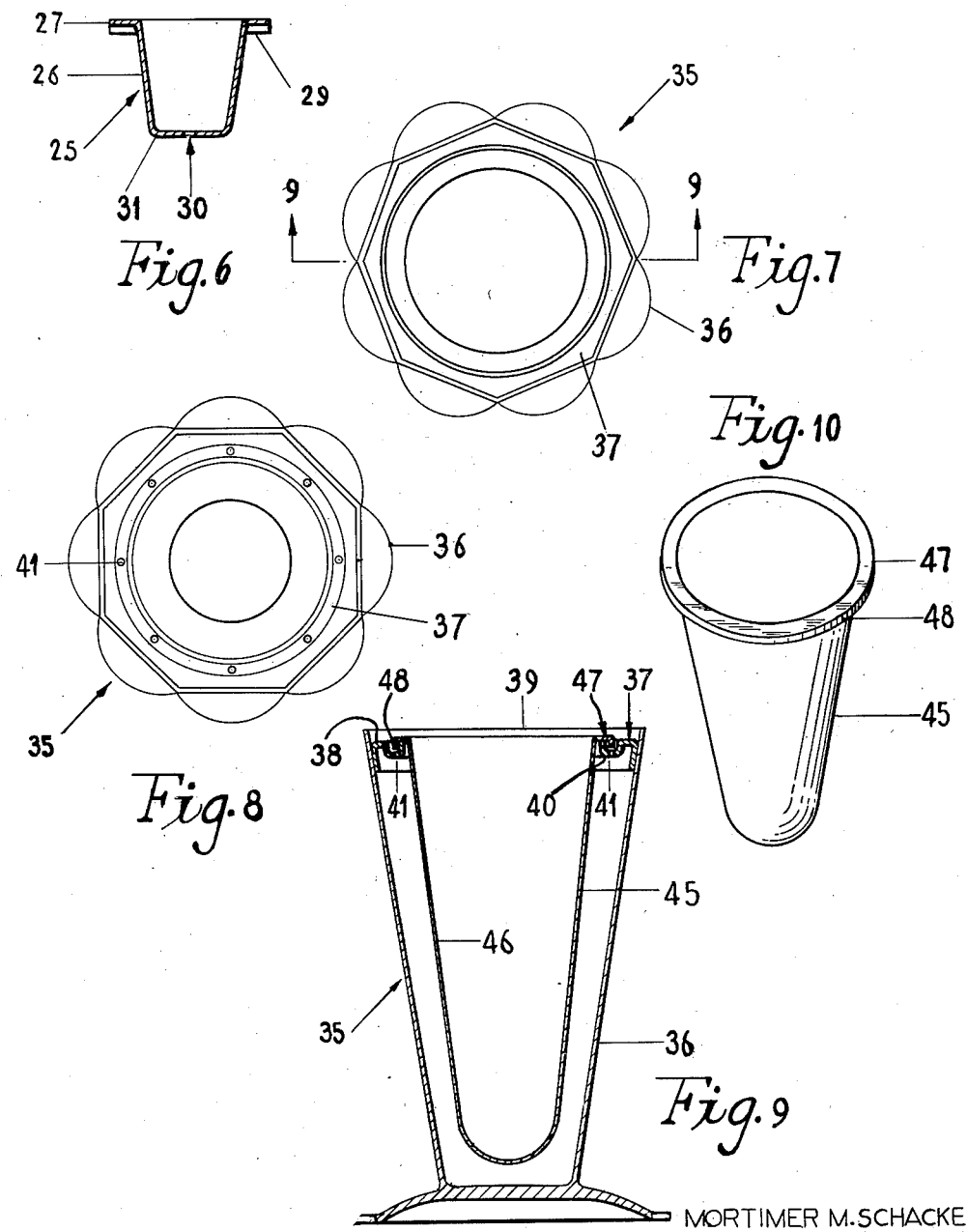
MORTIMER M. SCHACKETT
JAY L. SCHACKETT
*INVENTORS*
BY Joseph Blacker
ATTORNEY Patented Mar. 8, 1949

2,463,719

UNITED STATES PATENT OFFICE 2,463,719

INTERCHANGEABLE PLANT AND FLOWER RECEPTACLE

Mortimer M. Schackett and Jay L. Schackett, Brooklyn, N. Y.

Application December 29, 1945, Serial No. 638,074

2 Claims. (Cl. 47—34)

This invention relates to boxes for flower pots and particularly to a receptacle having a plurality of individual flanged frames, the frames having openings to receive flower pots, whereby the flower pots are supported by the frames.

An object of this invention is to provide supporting means for grouping individual units of flower pots in varied arrangement, while permitting removal and replacement of the separate units, and providing a receptacle common to all of the units.

Another object of this invention is to provide a flower pot receptacle having a U-shaped member or inner supporting means positioned on opposite side walls, the upper surface of the supporting means being positioned below the upper level of the receptacle, the supporting means having drainage apertures, considerably below the top of the receptacle, the distance between the inner faces of the flanges being of a size to cause the flanges to be in contacting relation with the inner walls of the U-shaped member to form a pre-determined vertical opening communicating with the drainage apertures, whereby when excess water is poured on the plants the water drains into the receptacle through the drainage apertures.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 1 is a top plan view of an embodiment of the invention, showing means for supporting flower pots.

Figure 2 is a side elevation of the flower pot supporting means shown in Figure 1, partly broken away to show the interior.

Figure 3 is a cross-sectional view, the section being taken as on line 3—3 in Figure 1.

Figure 4 is a perspective view of a flower pot carrying frame.

Figure 5 is a view of a fragmentary portion of the receptacle.

Figure 6 is a central cross-sectional view of a combined flower pot and frame.

Figure 7 is a top plan view of a vase-type receptacle and a flower carrier.

Figure 8 is a top plan view of the receptacle shown in Figure 7, the flower carrier being removed.

Figure 9 is a central cross-sectional view of the receptacle and flower carrier, the section being taken as on line 9—9 in Figure 7.

Figure 10 is a perspective view of the flower carrier.

In the illustrated embodiment of the invention, shown in Figures 1 to 6 inclusive, the numeral 10 indicates an interchangeable flower-pot supporting device, comprising a receptacle 11 of rectangular cross-section, which terminates at its upper surface in a bead 12. The bead extends all around the receptacle.

A U-shaped supporting member 13 extends below the bead 12 and is preferably made integral with the bead. The upper surface 14 of the inner side 15 of the U-shaped member 13 is below the upper surface of the receptacle 11.

Frames 16, made of flat sheet metal, are mounted in side-by-side contacting relation on the supporting members 13. The frames 16 are preferably of equal overall dimensions and a pre-determined number of frames cover the supporting members lengthwise so that only a narrow vertical opening 17 appears between the frames and the inner surface of the bead 12.

As best shown in Figure 4, each frame 16 has downwardly extending reinforcing flanges 18, 19. Each frame has an aperture in which a flower-pot may be mounted in supported relation.

The respective frames have apertures of various sizes and shapes, such as round, square, elliptical, etc. The user may thus select an assortment of frames and flower-pots of different shapes or of identical shape and to vary the assortment as desired. The apertures in the flower pot supporting frames 16 are identified by the numerals 20, $20'$, $20^2$ and $20^3$.

In use, when the plants are watered, any excess water drains through the vertical opening 17 and through drainage apertures 22 in the lower surface of the supporting member 13 into the bottom of the receptacle 11. It is to be noted that the bead 12 extends above the frames 16 and that the water cannot flow over the bead.

It is to be noted that the distance between the inner faces of the flanges 18 is arranged so as to cause the flanges to be in contacting relation with the inner walls of the U-shaped member 13 to form the predetermined vertical opening 17 communicating with the drainage apertures 22.

Figure 6 is a central cross-sectional view of a combined flower pot and frame 25, comprising a flower pot body member 26 and a supporting frame 27. The frame member 27 has downwardly extending reinforcing flanges 29 similar to the supporting flanges 18 and 19 shown in Figure 4. The flower pot body number 26 has a drainage aperture 30 in its base 31.

The flower pots or the frame supports can be interchanged, for grouping individual units of flower pots.

The receptacle may be made of metal or any other suitable material, either by assembling the several walls and attaching them together, or all of the walls may be made integral, especially when the receptacle is stamped out of sheet metal.

Figures 7 to 9 inclusive show a vase type receptacle and flower carrier 35 comprising a vertically elongated receptacle 36 and a supporting frame 37. The upper surface of the frame 37 comprises a bead 38 which is considerably below the upper surface 39 of the receptacle 36 so that when the flowers are watered any excess water cannot flow over the receptacle.

It is to be noted that inwardly of the bead 38 is a supporting member 40 of U-shaped cross-section. The lower surface of the supporting member 40 has drainage apertures 41.

Mounted in the supporting frame 37 is a flower carrier 45 comprising a receptacle 46 adapted to contain water for the flower stems. The flower carrier 45 has an integral supporting frame 47 having a downwardly extending reinforcing flange 48.

In accordance with the patent statutes we have described and illustrated the preferred embodiments of our invention, but it will be understood that various changes and modifications can be made therein without departing from the spirit of the invention as defined by the appended claims.

We claim:

1. A receptacle for flower carrying means permitting interchangeability and selection thereof, comprising a receptacle having inner supporting means positioned on opposite side walls, the upper surface of said supporting means being positioned below the upper level of said receptacle, a plurality of frames formed to support said flower carrying means and adapted to rest on said supporting means, said supporting means being U-shaped in cross-section and having drainage apertures in the horizontal faces thereof permitting drainage into said receptacle of excess water poured on plants in said flower carrying means, each of said frames having laterally extending flanges at opposite sides thereof, the distance between the inner faces of said flanges being arranged so as to cause said flanges to be in contacting relation only with the inner walls of said U-shaped member to form predetermined vertical openings communicating with said drainage apertures.

2. A receptacle for flower carrying means permitting interchangeability and selection thereof, comprising a receptacle having inner supporting means positioned on opposite side walls, the upper surface of said supporting means being positioned below the upper level of said receptacle, frame means for said flower carrying means adapted to rest on said supporting means, said supporting means being U-shaped in cross-section and providing an elongated opening extending all around said receptacle, said supporting means having drainage apertures in the horizontal faces thereof permitting drainage into said receptacle of excess water poured on plants in said flower carrying means, each of said frame means having laterally extending flanges at opposite sides thereof, the distance between the inner faces of said flanges being arranged so as to cause said flanges to be in contacting relation with the inner walls of said U-shaped supporting means, the width of said elongated opening in said U-shaped supporting means being greater than the thickness of one of said flanges to form predetermined vertical openings communicating with said drainage apertures at each side of said frames.

MORTIMER M. SCHACKETT.
JAY L. SCHACKETT.

REFERENCES CITED

The following references are of record in the file of this patent:

UNITED STATES PATENTS

| Number | Name | Date |
|--------|------|------|
| 177,577 | Simonds | May 16, 1876 |
| 905,238 | Schaffer | Dec. 1, 1908 |
| 1,989,403 | Dauernheim | Jan. 29, 1935 |
| 2,313,059 | Freeman | Mar. 9, 1943 |